United States Patent
Kim et al.

(10) Patent No.: US 8,964,353 B2
(45) Date of Patent: Feb. 24, 2015

(54) MULTILAYER CERAMIC ELECTRONIC COMPONENT

(71) Applicant: Samsung Electro-Mechanics Co., Ltd., Suwon, Gyunggi-do (KR)

(72) Inventors: Wi Heon Kim, Gyunggi-do (KR); Doo Young Kim, Gyunggi-do (KR); Jae Yeol Choi, Gyunggi-do (KR); Jong Ho Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 22 days.

(21) Appl. No.: 13/715,858

(22) Filed: Dec. 14, 2012

(65) Prior Publication Data

US 2014/0146436 A1    May 29, 2014

(30) Foreign Application Priority Data

Nov. 29, 2012   (KR) .......................... 10-2012-0136772

(51) Int. Cl.
| | |
|---|---|
| H01G 4/005 | (2006.01) |
| H01G 4/228 | (2006.01) |
| H01G 4/01 | (2006.01) |
| H01G 4/12 | (2006.01) |

(52) U.S. Cl.
CPC ... *H01G 4/01* (2013.01); *H01G 4/12* (2013.01)
USPC ...................... 361/303; 361/306.3; 361/301.4

(58) Field of Classification Search
USPC ............................. 361/303, 311, 301.4, 306.3
See application file for complete search history.

(56) References Cited

U.S. PATENT DOCUMENTS

| | | | |
|---|---|---|---|
| 6,292,351 B1 * | 9/2001 | Ahiko et al. ............... | 361/306.3 |
| 6,683,782 B2 | 1/2004 | Duva | |
| 7,672,112 B2 * | 3/2010 | Hattori et al. .............. | 361/306.2 |
| 2005/0286203 A1 * | 12/2005 | Togashi et al. ............. | 361/301.4 |

(Continued)

FOREIGN PATENT DOCUMENTS

| | | |
|---|---|---|
| JP | 2000-208361 A | 7/2000 |
| JP | 2006-013245 A | 1/2006 |
| JP | 2006-086359 A | 3/2006 |

(Continued)

OTHER PUBLICATIONS

Notice of Office Action Japanese Patent Application No. 2012-273969 dated Oct. 22, 2013 with English translation.

(Continued)

*Primary Examiner* — Eric Thomas
(74) *Attorney, Agent, or Firm* — McDermott Will & Emery LLP

(57) ABSTRACT

Multilayer ceramic electronic component includes: a ceramic body including dielectric layers and having first and second main surfaces, first and second side surfaces, and first and second end surfaces; a first internal electrode including a capacitance forming portion having an overlap region for forming capacitance and a first lead-out portion extended from the capacitance forming portion to be exposed to the first side surface; a second internal electrode alternately stacked with the first internal electrode, having the dielectric layer interposed therebetween, insulated from the first internal electrode, and having a second lead-out portion extended from the capacitance forming portion to be exposed to the first side surface; first and second external electrodes connected to the first and second lead-out portions, respectively; an insulation layer.

14 Claims, 8 Drawing Sheets

(56) References Cited

U.S. PATENT DOCUMENTS

2008/0174934 A1 7/2008 Togashi
2009/0073634 A1* 3/2009 Lee et al. ................. 361/303

FOREIGN PATENT DOCUMENTS

| JP | 2008-71811 A | 3/2008 |
| JP | 2008-258481 A | 10/2008 |
| JP | 2009-026872 A | 2/2009 |
| JP | 2009-054973 A | 3/2009 |
| JP | 2011-204778 A | 10/2011 |

OTHER PUBLICATIONS

Notice of Office Action Korean Patent Application No. 10-2012-0136772 dated Dec. 27, 2013 with English translation.

Japanese Office Action, w/ English translation thereof, issued in Japanese Patent Application No. JP 2012-273969 dated Mar. 25, 2014.

Taiwanese Examination Report dated Jul. 31, 2014 issued in the corresponding Taiwanese Patent Application No. 101148268 (English translation).

* cited by examiner

MULTILAYER CERAMIC ELECTRONIC COMPONENT

CROSS-REFERENCE TO RELATED APPLICATIONS

This application claims the priority of Korean Patent Application No. 10-2012-0136772 filed on Nov. 29, 2012, in the Korean Intellectual Property Office, the disclosure of which is incorporated herein by reference.

BACKGROUND OF THE INVENTION

1. Field of the Invention

The present invention relates to a multilayer ceramic electronic component capable of reducing short circuits between internal electrodes and acoustic noise generated by the multilayer ceramic electronic component at the time of applying voltage.

2. Description of the Related Art

Electronic components using a ceramic material include a capacitor, an inductor, a piezoelectric element, a varistor, a thermistor, and the like.

Among ceramic electronic components using a ceramic material, a multilayer ceramic capacitor (MLCC) has advantages such as compactness, guaranteed high capacitance, and ease of mountability.

An MLCC is a chip-type condenser commonly installed in computers, personal digital assistants, mobile phones, and the like, playing an important role in charging and discharging electricity. An MLCC may have various sizes and lamination forms, according to an intended use and capacity thereof.

In particular, recently, as electronic products have been reduced in size, MLCCs used in electronic products have also been required to be compact and have high capacitance.

Thus, MLCCs including thinned dielectric layers and internal electrodes so as to have a reduced size and including a large number of dielectric layers so as to have high capacitance have been manufactured.

Meanwhile, an MLCC in which all external electrodes are positioned on a lower surface has been introduced. This type of MLCC has excellent mounting density, superior capacitance and low ESL; however, short circuits may easily occur between internal electrodes due to positional errors between the opposing internal electrodes by stress when a ceramic body is cut.

RELATED ART DOCUMENT (Patent Document 1) Japanese Patent Laid-open Publication No. 2006-086359

SUMMARY OF THE INVENTION

An aspect of the present invention provides a multilayer ceramic electronic component capable of reducing short circuits between internal electrodes and acoustic noise generated in the multilayer ceramic electronic component at the time of voltage application.

According to an aspect of the present invention, there is provided a multilayer ceramic electronic component including: a ceramic body including a dielectric layer and having first and second main surfaces opposing one another, first and second side surfaces opposing one another, and first and second end surfaces opposing one another; a first internal electrode formed in the ceramic body and including a capacitance forming portion having an overlap region for forming capacitance and a first lead out portion extended from the capacitance forming portion to be exposed to the first side surface; a second internal electrode alternately stacked with the first internal electrode, having the dielectric layer interposed therebetween, insulated from the first internal electrode, and having a second lead out portion extended from the capacitance forming portion to be exposed to the first side surface; first and second external electrodes connected to the first and second lead out portions, respectively; and an insulation layer formed on the first side surface of the ceramic body, wherein the first lead out portion in a length direction of the ceramic body is longer than the second lead out portion in the length direction.

When a length of the first and second internal electrodes in the length direction of the ceramic body is defined as L, a length of the first lead out portion in the length direction of the ceramic body is defined as L1, and a length of the second lead out portion in the length direction of the ceramic body is defined as L2, $0.05 \leq L2/(L-L1) \leq 0.9$ may be satisfied.

The first and second internal electrodes may be disposed perpendicularly with respect to a mounting surface of the ceramic body.

The first external electrode may be extended to at least one of the first main surface, the second main surface, and the second side surface of the ceramic body.

The second external electrode may be extended to at least one of the first main surface, the second main surface, and the second side surface of the ceramic body.

The insulation layer may include at least one selected from a group consisting of epoxy, a heat resistant polymer, glass, and ceramic.

The insulation layer may be formed to cover all of the exposed portions of the first and second internal electrodes.

The insulation layer may have a thickness less than those of the first and second external electrodes measured from the first side surface of the ceramic body.

According to another aspect of the present invention, there is provided a multilayer ceramic electronic component including: a ceramic body including a dielectric layer and having first and second main surfaces opposing one another, first and second side surfaces opposing one another, and first and second end surfaces opposing one another; a first unit including a first internal electrode having a capacitance forming portion formed in an overlap region provided to form capacitance in the ceramic body and exposed to the first side surface and a first lead out portion extended from the capacitance forming portion to be exposed to the first side surface, and a second internal electrode alternately stacked with the first internal electrode, having the dielectric layer interposed therebetween, insulated from the first internal electrode, and including a second lead out portion extended from the capacitance forming portion to be exposed to the first side surface; a second unit including a third internal electrode having a capacitance forming portion formed in the ceramic body and having an overlap region for forming the capacitance and a third lead out portion extended from the capacitance forming portion to be exposed to the first side surface, and a fourth internal electrode alternately stacked with the third internal electrode, having the dielectric layer interposed therebetween, insulated from the third internal electrode, and including a fourth lead out portion extended from the capacitance forming portion to be exposed to the first side surface; a first external electrode connected to the first and third lead out portions and a second external electrode connected to the second and fourth lead out portions; and an insulation layer formed on the first side surface of the ceramic body, wherein the first and second units are alternately stacked, having the dielectric layer interposed therebetween.

When a length of the first to fourth internal electrodes in a length direction of the ceramic body is defined as L, a length of a portion of the first internal electrode exposed to the first side surface in the length direction of the ceramic body is defined as L3, and a length of the fourth lead out portion in the length direction of the ceramic body is defined as L4, $0.05 \leq L4/(L-L3) \leq 0.9$ may be satisfied.

The first and second internal electrodes may be disposed perpendicularly with respect to a mounting surface of the ceramic body.

The first external electrode may be extended to at least one of the first main surface, the second main surface, and the second side surface of the ceramic body.

The second external electrode may be extended to at least one of the first main surface, the second main surface, and the second side surface of the ceramic body.

The insulation layer may include at least one selected from a group consisting of epoxy, a heat resistant polymer, glass, and ceramic.

The insulation layer may be formed to cover all of the exposed portions of the first and second internal electrodes.

The insulation layer may have a thickness less than those of the first and second external electrodes measured from the first side surface of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
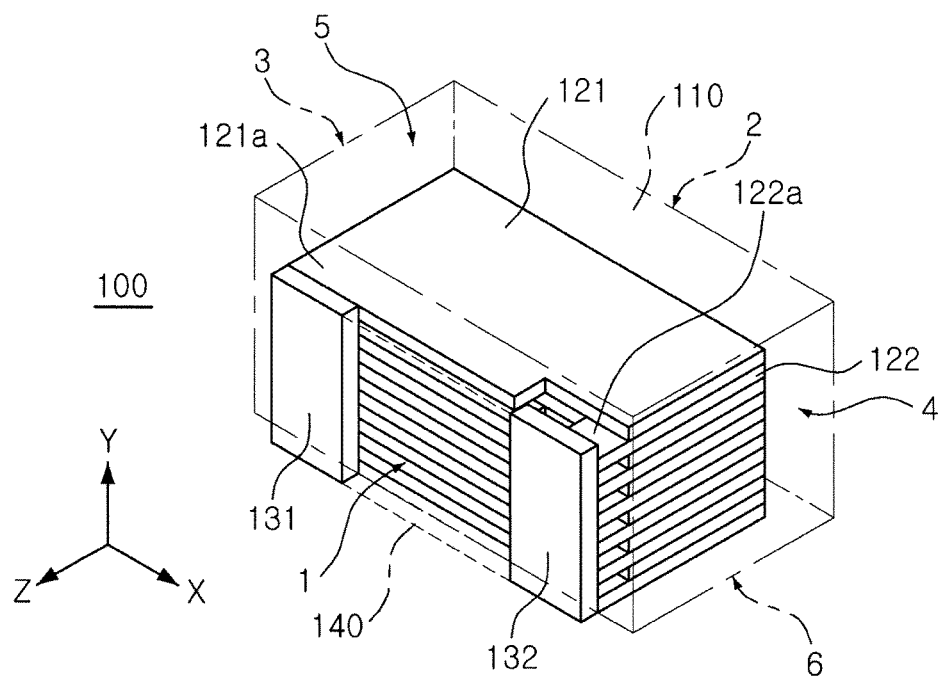
FIG. 1 is a perspective view schematically showing a structure of a multilayer ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

FIG. 1 is a perspective view schematically showing a structure of a multilayer ceramic capacitor according to an embodiment of the present invention.

Figure 2:
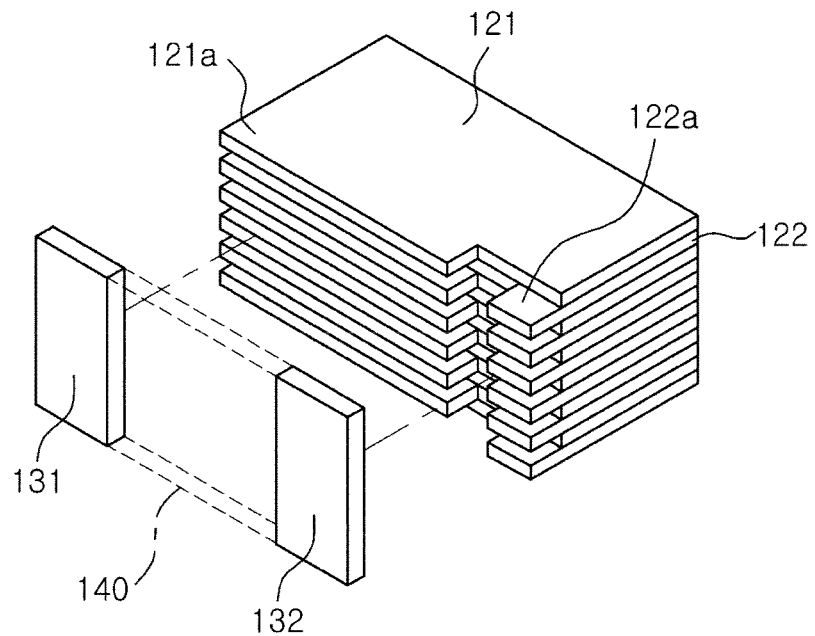
FIG. 2 is an exploded perspective view of FIG. 1.

FIG. 2 is an exploded perspective view of FIG. 1.

Figure 3:
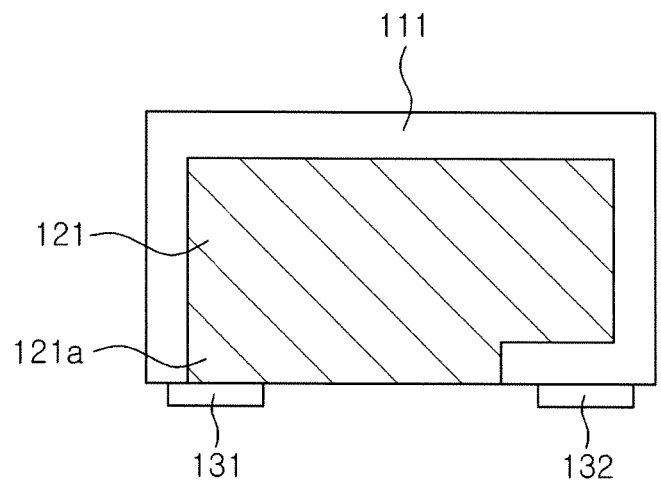
FIG. 3 is a cross-sectional view showing a structure in which a first internal electrode and a first external electrode of FIG. 1 are coupled to each other.

FIG. 3 is a cross-sectional view showing a structure in which a first internal electrode and a first external electrode of FIG. 1 are coupled to each other.

Figure 4:
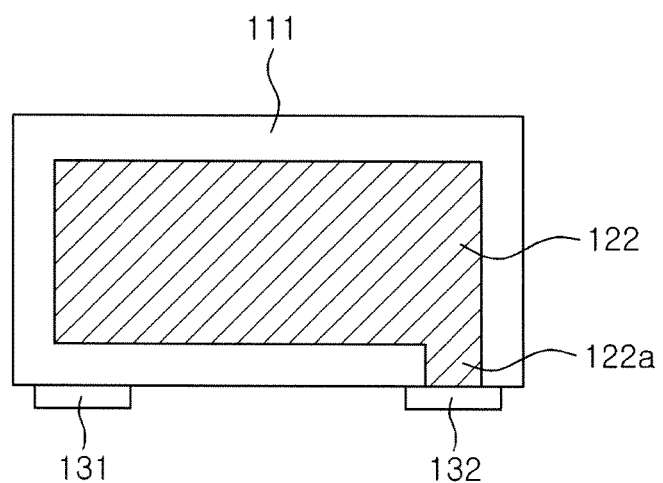
FIG. 4 is a cross-sectional view showing a structure in which a second internal electrode and a second external electrode of FIG. 1 are coupled to each other.

FIG. 4 is a cross-sectional view showing a structure in which a second internal electrode and a second external electrode of FIG. 1 are coupled to each other.

Figure 5:
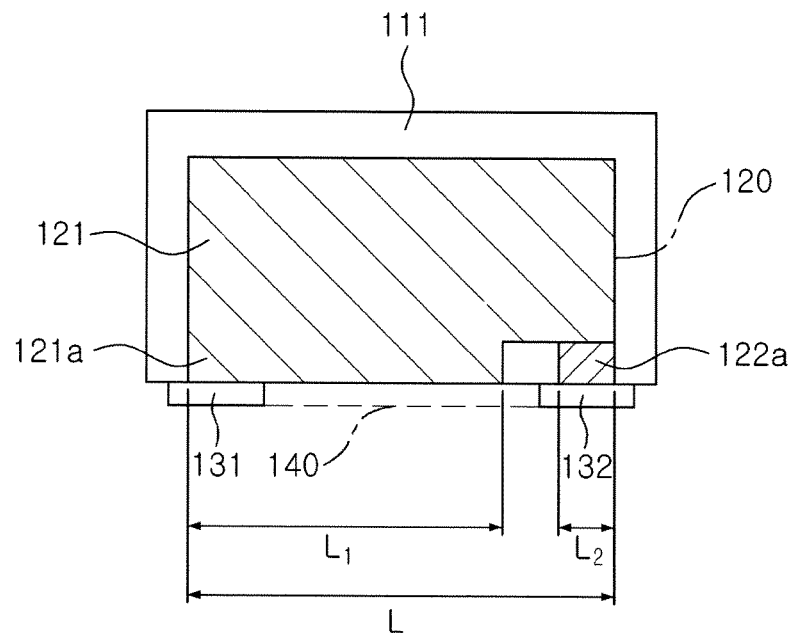
FIG. 5 is a cross-sectional view showing a structure in which the first and second internal electrodes and the first and second external electrodes of FIG. 1 are coupled to each other.

FIG. 5 is a cross-sectional view showing a structure in which the first and second internal electrodes and the first and second external electrodes of FIG. 1 are coupled to each other.

Figure 6:
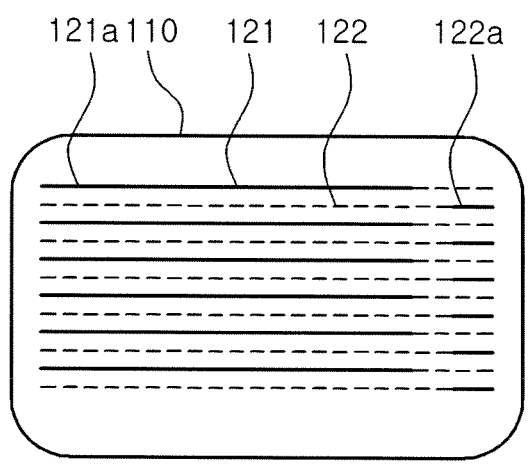
FIG. 6 is a schematic view showing an internal structure of the multilayer ceramic capacitor of FIG. 1 when being viewed from a first side surface.

FIG. 6 is a schematic view schematically showing an internal structure of the multilayer ceramic capacitor when being viewed from a first side surface of FIG. 1.

A multilayer ceramic capacitor 100 according to the present embodiment may be a two-terminal vertically laminated or vertically multilayered capacitor. "Vertically laminated or vertically multilayered" means that multilayer internal electrodes within a capacitor are disposed perpendicularly with respect to a mounting surface of a circuit board, and "two-terminal" means that two terminals are connected to the circuit board as terminals of the capacitor.

Referring to FIGS. 1 through 7, the multilayer ceramic capacitor 100 according to the embodiment of the present invention may include a ceramic body 110; internal electrodes 121 and 122 formed in the ceramic body 110; and an insulation layer 140 and external electrodes 131 and 132 formed on one surface of the ceramic body.

According to the present embodiment, the ceramic body 110 may have first and second main surfaces 5 and 6 opposing one another, and first and second side surfaces 1 and 2 as well as first and second end surfaces 3 and 4 that connect the first and second main surfaces 5 and 6 to each other. A shape of the ceramic body 110 is not particularly limited, but may be a hexahedral shape as shown. According to the embodiment of the present invention, the first side surface 1 of the ceramic body may be a mounting surface disposed in a mounting region of a circuit board.

According to the embodiment of the present invention, an x-direction refers to a direction in which the first and second external electrodes are formed, having a predetermined interval therebetween; a y-direction refers to a direction in which the internal electrodes are stacked, having a dielectric layer interposed therebetween; and a z-direction refers to a direction in which the internal electrodes are mounted on the circuit board.

According to the embodiment of the present invention, the ceramic body 110 may be formed by stacking a plurality of dielectric layers 111. The plurality of dielectric layers 111 configuring the ceramic body 110 may be in a sintered state and be integrated with each other such that boundaries therebetween may not be readily apparent.

The dielectric layer 111 may be formed by sintering a ceramic green sheet including a ceramic powder, an organic solvent, and an organic binder. The ceramic powder is a material having a high K-dielectric constant (or high permittivity), and as the ceramic powder, for example, a barium titanate ($BaTiO_3$)-based material, a strontium titanate ($SrTiO_3$)-based material, or the like, may be used. However, the ceramic powder is not limited thereto.

According to the embodiment of the present invention, the ceramic body 110 may include the internal electrodes formed therein.

Referring to FIGS. 3 through 5, the first internal electrode 121 having a first polarity and the second internal electrode 122 having a second polarity may be formed in pairs and may be disposed in the y-direction so as to face each other, having the dielectric layer 111 therebetween.

According to the embodiment of the present invention, the first and second internal electrodes 121 and 122 may be disposed perpendicularly with respect to the mounting surface, that is, the first side surface 1, of the multilayer ceramic capacitor.

In the present invention, the terms 'first' and 'second' may mean different electrical polarities.

According to the embodiment of the present invention, the first and second internal electrodes 121 and 122 may be formed of a conductive paste including a conductive metal.

The conductive metal may be nickel (Ni), copper (Cu), palladium (Pd), or an alloy thereof, but is not limited thereto.

The internal electrode layers may be printed on the ceramic green sheets configuring the dielectric layers using the conductive paste by a printing method such as a screen printing method or a gravure printing method.

The ceramic green sheets having the internal electrode layers printed thereon may be alternately stacked and sintered to form the ceramic body.

The multilayer ceramic capacitor 100 according to the embodiment of the present invention may include the first internal electrode 121 having a capacitance forming portion 120 formed in the ceramic body 110 and having an overlap region for forming capacitance and a first lead out portion 121a extended from the capacitance forming portion 120 to be exposed to the first side surface 1, and the second internal electrode 122 alternately stacked with the first internal electrode 121, having the dielectric layer 111 therebetween, insulated from the first internal electrode 121, and having a second lead out portion 122a extended from the capacitance forming portion 120 to be exposed to the first side surface 1.

The first and second internal electrodes 121 and 122 have the first and second lead out portions 121a and 122a, respectively, so as to be connected to the external electrodes having different polarities, and the first and second lead out portions 121a and 122a may be exposed to the first side surface 1 of the ceramic body 110.

According to the embodiment of the present invention, in the multilayer ceramic capacitor, which is the vertically laminated or vertically multilayered capacitor, the first and second lead out portions 121a and 122a may be exposed to the same surface of the ceramic body.

According to the embodiment of the present invention, the lead out portion of the internal electrode refers to a region in which a conductor pattern forming the internal electrode has an increased width W in a portion thereof to thereby be exposed to one surface of the ceramic body.

The first and second internal electrodes 121 and 122 may form capacitance in a region in which the first and second internal electrodes 121 and 122 are overlapped with each other, and the first and second lead out portions 121a and 122a connected to respective external electrodes having different polarities do not have an overlap region.

As described above, since the first and second lead out portions 121a and 122a are not overlapped with each other but are insulated from each other, short circuits between the internal electrodes due to positional errors between the internal electrodes opposing one another by stress when the ceramic body is cut may be reduced.

According to the embodiment of the present invention, a length of the first lead out portion 121a in a length direction of the ceramic body 110 may be longer than that of the second lead out portion 122a.

The first and second lead out portions 121a and 122a are not overlapped with each other, such that the first and second internal electrodes 121 and 122 may be insulated from each other.

The length of the first lead out portion 121a in the length direction of the ceramic body 110 may be longer than that of the second lead out portion 122a, such that a path for removing remaining materials may be further secured when the ceramic body is sintered.

Therefore, connectivity of the internal electrodes may be further improved, such that capacitance of the multilayer ceramic capacitor may be increased.

Referring to FIG. 5, when a length of the first and second internal electrodes 121 and 122 in the length direction of the ceramic body 110 is defined as L, the length of the first lead out portion 121a in the length direction of the ceramic body 110 is defined as L1, and the length of the second lead out portion 122a in the length direction of the ceramic body 110 is defined as L2, $0.05 \leq L2/(L-L1) \leq 0.9$ may be satisfied.

As described above, the length L of the first and second internal electrodes 121 and 122, the length L1 of the first lead out portion 121a, and the length L2 of the second lead out portion 122a are adjusted so as to satisfy the following equation: $0.05 \leq L2/(L-L1) \leq 0.9$, such that the capacitance may be increased, and short circuits may be reduced.

In the case in which $L2/(L-L1)$ is below 0.05, the lengths of the first and second lead out portions 121a and 122a exposed to the first side surface of the ceramic body 110 are short, such that it may be difficult to secure a sufficient path for removing the remaining materials, an effect of an increase in the capacitance may be insignificant.

In the case in which $L2/(L-L1)$ is larger than 0.9, an interval between the first and second lead out portions 121a and 122a exposed to the first side surface of the ceramic body 110 is narrow, short circuits may occur.

Referring to FIG. 6, it may be appreciated that the first and second internal electrodes 121 and 122 are alternately exposed to the first side surface 1 of the ceramic body 110 as described above.

Referring to FIGS. 3 through 5, the first external electrode 121 may be formed to be connected to the first lead out portion 121a of the first internal electrode 121 exposed to the first side surface 1 of the ceramic body 110, and the second external electrode 132 may be formed to be connected to the second lead out portion 122a of the second internal electrode 122 exposed to the first side surface 1 of the ceramic body 110.

The first external electrode 131 may be formed on the first side surface 1 of the ceramic body so as to be connected to the first lead out portion 121a and may be extended to the first end surface 3 of the ceramic body, but is not limited thereto.

The second external electrode 132 may be formed on the first side surface 1 of the ceramic body so as to be connected to the second lead out portion 122a and may be extended to the second end surface 4 of the ceramic body, but is not limited thereto.

That is, the first external electrode 131 may be extended to at least one of the first main surface 5, the second main surface 6, and the second side surface 2 of the ceramic body 110.

In addition, the second external electrode 132 may be extended to at least one of the first main surface 5, the second main surface 6, and the second side surface 2 of the ceramic body 110.

Therefore, according to the embodiment of the present invention, the first external electrode 131 may be formed to enclose one end portion of the ceramic body 110 in the length direction thereof while being connected to the first lead out portion 121a of the first internal electrode 121 exposed to the first side surface 1 of the ceramic body 110.

In addition, the second external electrode 132 may be formed to enclose the other end portion of the ceramic body 110 in the length direction thereof while being connected to the second lead out portion 122a of the second internal electrode 122 exposed to the first side surface 1 of the ceramic body 110.

The first and second external electrodes 131 and 132 may be formed of a conductive paste including a conductive metal.

The conductive metal may be nickel (Ni), copper (Cu), tin (Sn), or an alloy thereof, but is not limited thereto.

The conductive paste may further include an insulating material. The insulating material may be, for example, glass, but is not limited thereto.

A method of forming the first and second external electrodes 131 and 132 is not particularly limited. That is, the first and second electrodes 131 and 132 may be formed by dipping the ceramic body or be formed by a method such as a plating method, or the like.

Meanwhile, according to the embodiment of the present invention, as shown in FIG. 5, the insulation layer 140 may be formed on the first side surface 1 of the ceramic body 110.

The insulation layer 140 may be formed between the first and second external electrodes 131 and 132.

The insulation layer 140 may cover the first lead out portion 121a exposed to the first side surface 1 and cover the entire overlap region between the first and second internal electrodes 121 and 122.

According to the embodiment of the present invention, as shown in FIG. 5, the insulation layer 140 may be completely filled in one surface of the ceramic body between the first and second external electrodes.

In addition, although not shown, according to the embodiment of the present invention, the insulation layer 140 may be formed to cover only the first lead out portion 121a while having predetermined intervals from the first and second external electrodes 131 and 132.

According to the embodiment of the present invention, the insulation layer 140 may have a thickness less than that of the first external electrode 131 or the second external electrode 132. The thicknesses of the insulation layer and the external electrodes may be measured based on a mounting surface, that is, the first side surface 1.

According to the embodiment of the present invention, the insulation layer has a thickness less than those of the first and second external electrodes, such that the multilayer ceramic capacitor 100 may be more stably mounted on the circuit board.

In addition, the first and second external electrodes 131 and 132 may be formed on a portion of the first side surface of the ceramic body.

The insulation layer 140 may include at least one selected from a group consisting of, for example, epoxy, a heat resistant polymer, glass, and ceramic, but is not particularly limited.

According to the embodiment of the present invention, the insulation layer 140 may be formed of ceramic slurry.

The formation position and the thickness of the insulation layer 140 may be adjusted by adjusting an amount and a shape of the ceramic slurry.

After the ceramic body is formed by a sintering process, the insulation layer 140 may be formed by applying the ceramic slurry to the ceramic body and then sintering the ceramic slurry.

Alternatively, the insulation layer 140 may be formed by forming ceramic slurry configuring the insulation layer on a ceramic green sheet configuring the ceramic body and then sintering the ceramic slurry together with the ceramic green sheet.

A method of forming the ceramic slurry is not particularly limited. For example, the ceramic slurry may be sprayed by a spraying method or may be applied using a roller.

The insulation layer 140 may cover the first lead out portion 121a exposed to one surface of the ceramic body to prevent short-circuits between the internal electrodes and prevent an internal defect such as a deterioration of humidity resistance characteristics, or the like.

Figure 7:
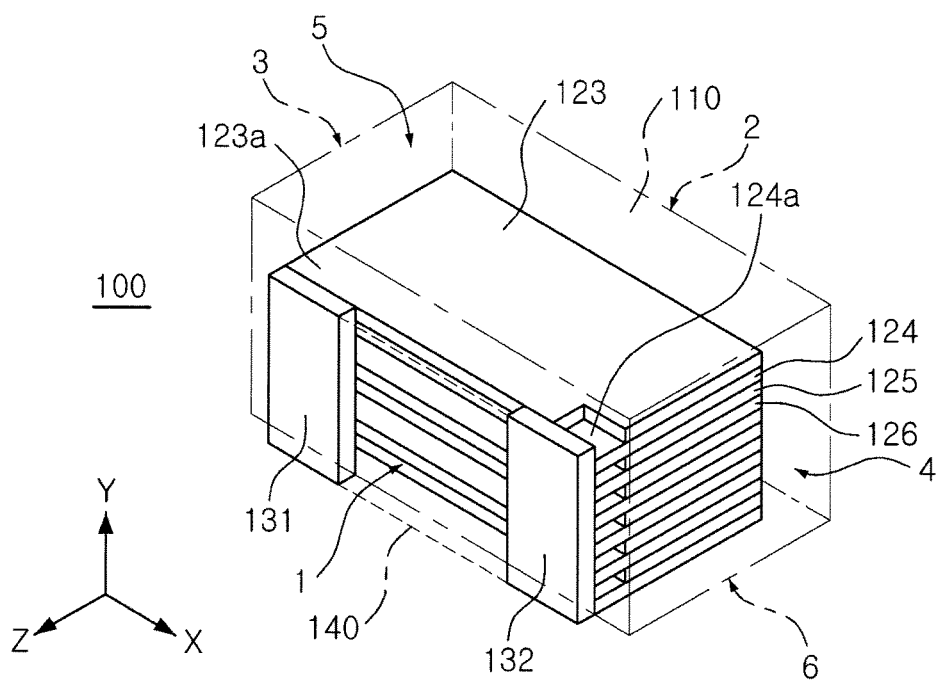
FIG. 7 is a perspective view schematically showing a structure of a multilayer ceramic capacitor according to another embodiment of the present invention.

FIG. 7 is a perspective view schematically showing a structure of a multilayer ceramic capacitor according to another embodiment of the present invention.

Figure 8:
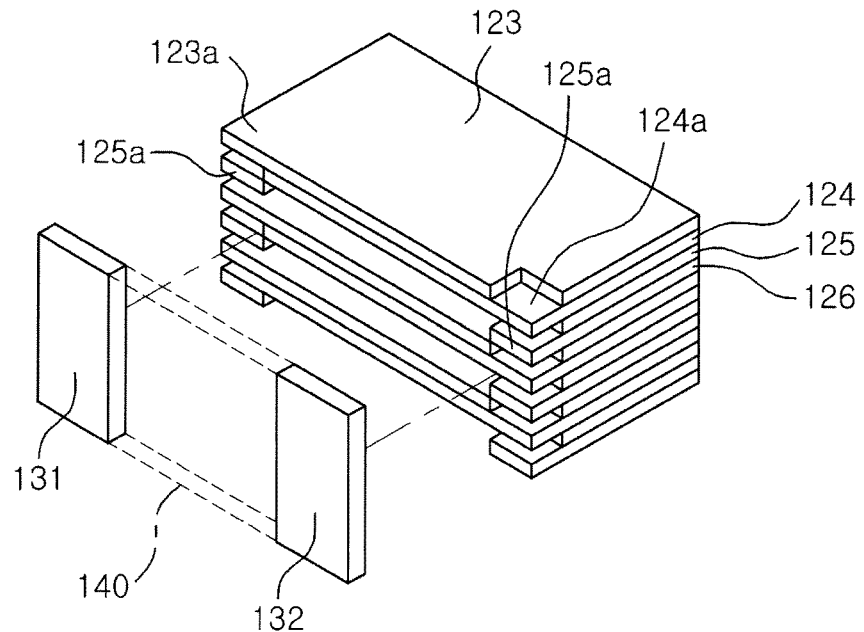
FIG. 8 is an exploded perspective view of FIG. 7.

FIG. 8 is an exploded perspective view of FIG. 7.

Figure 9:
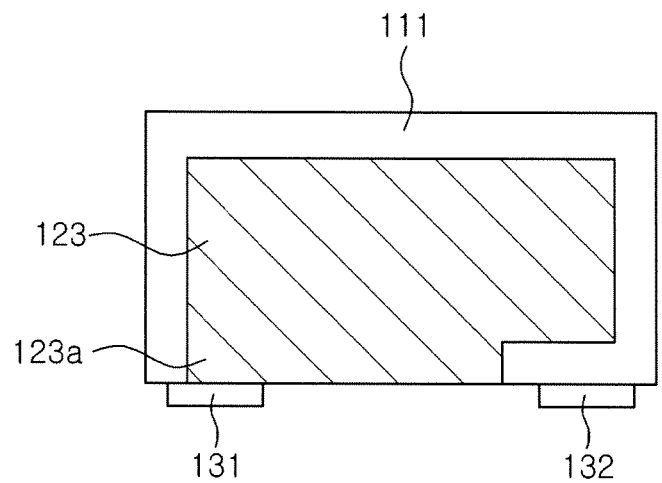
FIG. 9 is a cross-sectional view showing a structure in which a first internal electrode and a first external electrode of FIG. 7 are coupled to each other.

FIG. 9 is a cross-sectional view showing a structure in which a first internal electrode and a first external electrode of FIG. 7 are coupled to each other.

Figure 10:
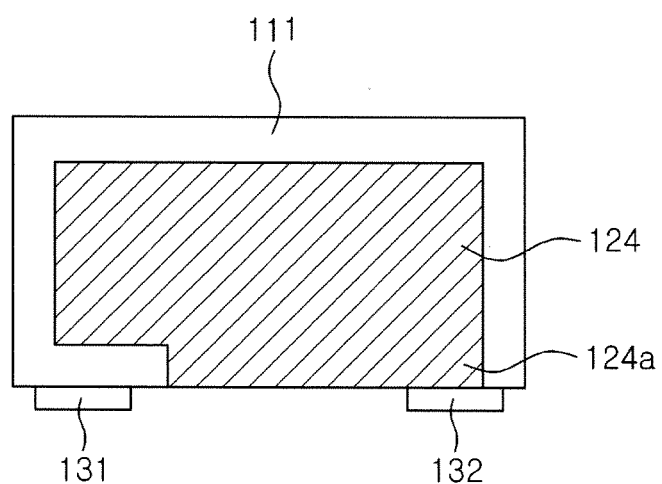
FIG. 10 is a cross-sectional view showing a structure in which a second internal electrode and a second external electrode of FIG. 7 are coupled to each other.

FIG. 10 is a cross-sectional view showing a structure in which a second internal electrode and a second external electrode of FIG. 7 are coupled to each other.

Figure 11:
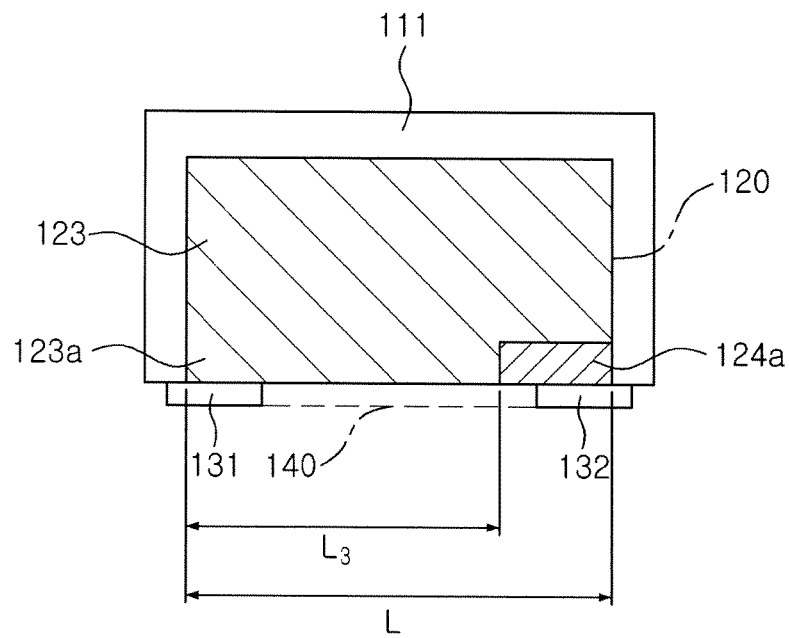
FIG. 11 is a cross-sectional view showing a structure in which the first and second internal electrodes and the first and second external electrodes of FIG. 7 are coupled to each other.

FIG. 11 is a cross-sectional view showing a structure in which the first and second internal electrodes and the first and second external electrodes of FIG. 7 are coupled to each other.

Figure 12:
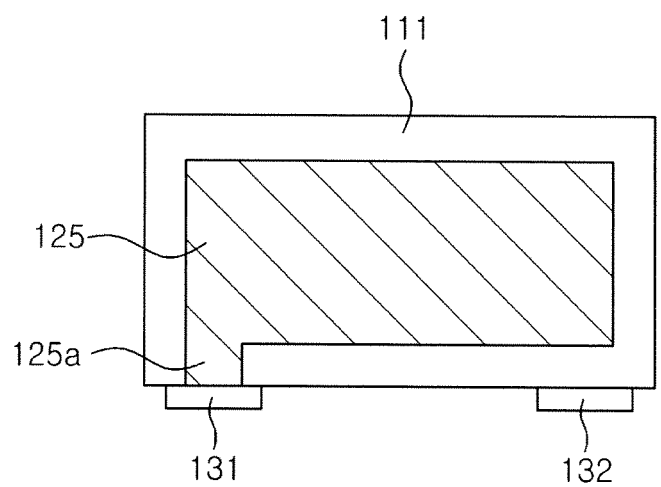
FIG. 12 is a cross-sectional view showing a structure in which a third internal electrode and the first external electrode of FIG. 7 are coupled to each other.

FIG. 12 is a cross-sectional view showing a structure in which a third internal electrode and the first external electrode of FIG. 7 are coupled to each other.

Figure 13:
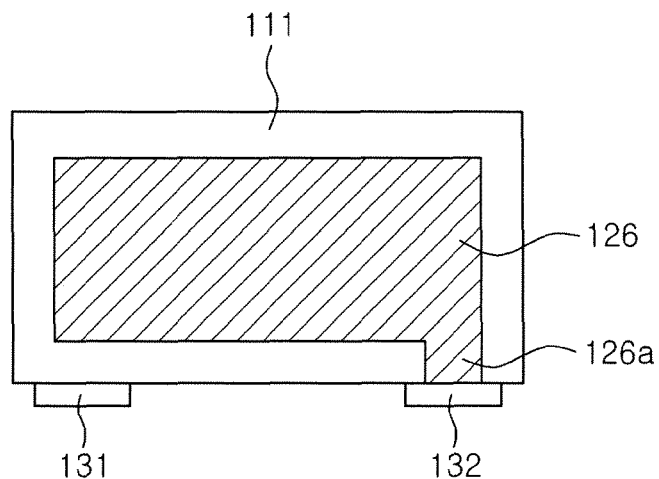
FIG. 13 is a cross-sectional view showing a structure in which a fourth internal electrode and the second external electrode of FIG. 7 are coupled to each other.

FIG. 13 is a cross-sectional view showing a structure in which a fourth internal electrode and the second external electrode of FIG. 7 are coupled to each other.

Figure 14:
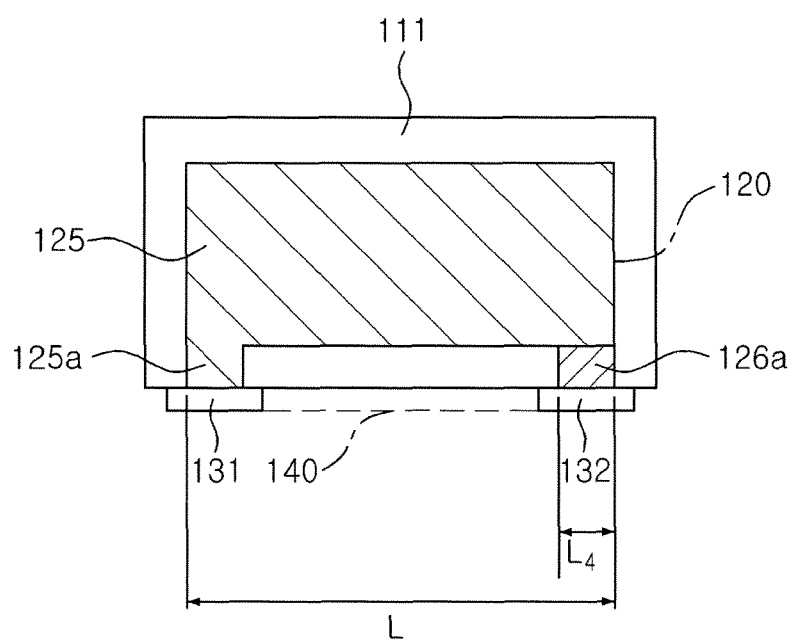
FIG. 14 is a cross-sectional view showing a structure in which the third and fourth internal electrodes and the first and second external electrodes of FIG. 7 are coupled to each other.

FIG. 14 is a cross-sectional view showing a structure in which the third and fourth internal electrodes and the first and second external electrodes of FIG. 7 are coupled to each other.

Figure 15:
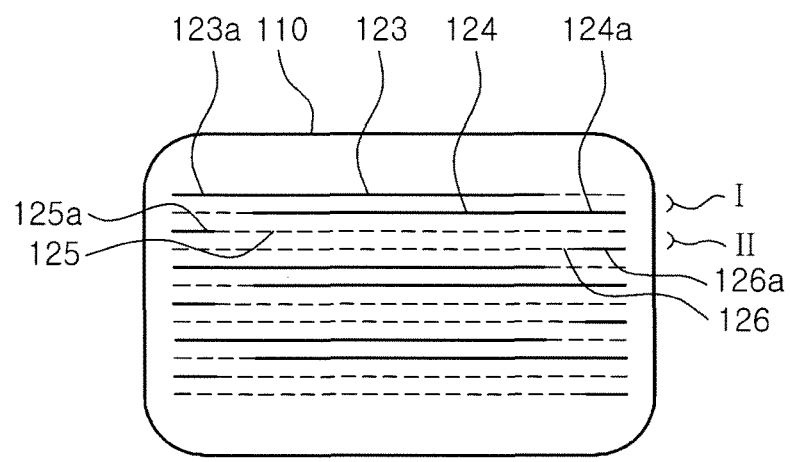
FIG. 15 is a schematic view showing an internal structure of the multilayer ceramic capacitor of FIG. 7 when being viewed from a first side surface.

FIG. 15 is a schematic view showing an internal structure of the multilayer ceramic capacitor when being viewed from a first side surface of FIG. 7.

Referring to FIGS. 7 through 15, a multilayer ceramic electronic component according to another embodiment of the present invention may include a ceramic body 110 including dielectric layers 111 and having first and second main surfaces 5 and 6 opposing one another, first and second side surfaces 1 and 2 opposing one another, and first and second end surfaces 3 and 4 opposing one another; a first unit I including a first internal electrode 123 including a capacitance forming portion 120 formed in an overlap region provided to form capacitance in the ceramic body 110 and exposed to the first side surface 1 and a first lead out portion 123a extended from the capacitance forming portion 120 to be exposed to the first side surface 1, and a second internal electrode 124 alternately stacked with the first internal electrode 123, having the dielectric layer 111 interposed therebetween, insulated from the first internal electrode 123, and including a second lead out portion 124a extended from the capacitance forming portion 120 to be exposed to the first side surface 1; a second unit II including a third internal electrode 125 including a capacitance forming portion 120 formed in the ceramic body 110 and having an overlap region for forming capacitance and a third lead out portion 125a extended from the capacitance forming portion 120 to be exposed to the first side surface 1, and a fourth internal electrode 126 alternately stacked with the third internal electrode 125, having the dielectric layer 111 interposed therebetween, insulated from the third internal electrode 125, and including a fourth lead out portion 126a extended from the capacitance forming portion 120 to be exposed to the first side surface 1; a first external electrode 131 connected to the first and third lead out portions 123a and 125a and a second external electrode 132 connected to the second and fourth lead out portions 124a and 126a; and an insulation layer 140 formed on the first side surface 1 of the ceramic body 110, wherein the first and second units I and II may be alternately stacked, having the dielectric layer 111 interposed therebetween.

In a length direction of the ceramic body, when a length of the first to fourth internal electrodes is defined as L, a length of a portion of the first internal electrode exposed to the first side surface is defined as L3, and a length of the fourth lead out portion is defined as L4, $0.05 \leq L4/(L-L3) \leq 0.9$ may be satisfied.

The first and second internal electrodes may be disposed perpendicularly with respect to amounting surface of the ceramic body.

The first external electrode may be extended to at least one of the first main surface, the second main surface, and the second side surface of the ceramic body.

The second external electrode may be extended to at least one of the first main surface, the second main surface, and the second side surface of the ceramic body.

The insulation layer may include at least one selected from a group consisting of epoxy, a heat resistant polymer, glass, and ceramic.

The insulation layer may be formed to cover all of the exposed portions of the first and second internal electrodes overlapped with each other.

The insulation layer may have a thickness less than those of the first and second external electrodes measured from the first side surface of the ceramic body 110.

Hereinafter, components different from those of the above-described embodiment of the present invention may be mainly described and a detailed description of the same components will be omitted.

The multilayer ceramic capacitor 100 according to the embodiment of the present invention may include the first unit I including the first internal electrode 123 including the capacitance forming portion 120 formed in the overlap region provided to form capacitance in the ceramic body 110 and exposed to the first side surface 1 and the first lead out portion 123a extended from the capacitance forming portion 120 so as to be exposed to the first side surface 1, and the second internal electrode 124 alternately stacked with the first internal electrode 123, having the dielectric layer 111 interposed therebetween, insulated from the first internal electrode 123, and including the second lead out portion 124a extended from the capacitance forming portion 120 so as to be exposed to the first side surface 1; and the second unit II including the third internal electrode 125 including the capacitance forming portion 120 formed in the ceramic body 110 and having the overlap region for forming capacitance and the third lead out portion 125a extended from the capacitance forming portion 120 so as to be exposed to the first side surface 1, and the fourth internal electrode 126 alternately stacked with the third internal electrode 125, having the dielectric layer 111 interposed therebetween, insulated from the third internal electrode 125, and including the fourth lead out portion 126a extended from the capacitance forming portion 120 so as to be exposed to the first side surface 1.

The first unit I may include the first internal electrode 123 including the capacitance forming portion 120 formed in the overlap region so as to form capacitance in the ceramic body 110 and exposed to the first side surface 1 and the first lead out portion 123a extended from the capacitance forming portion 120 so as to be exposed to the first side surface 1; and the second internal electrode 124 alternately stacked with the first internal electrode 123, having the dielectric layer 111 interposed therebetween, insulated from the first internal electrode 123, and including the second lead out portion 124a extended from the capacitance forming portion 120 so as to be exposed to the first side surface 1.

The first and second internal electrodes 123 and 124 have the first and second lead out portions 123a and 124a, respectively, so as to be connected to the external electrodes having different polarities, wherein the first and second lead out portions 123a and 124a may be exposed to the first side surface 1 of the ceramic body 110.

According to the embodiment of the present invention, in the multilayer ceramic capacitor, the vertically laminated or vertically multilayered capacitor, the first and second lead out portions 123a and 124a may be exposed to the same surface of the ceramic body.

According to the embodiment of the present invention, the lead out portion of the internal electrode refers to a region in which a conductor pattern forming the internal electrode has an increased width W in a portion thereof to thereby be exposed to one surface of the ceramic body.

Generally, the first and second internal electrodes may form capacitance in a region in which the first and second internal electrodes are overlapped with each other, and the lead out portions connected to respective external electrodes having different polarities do not have an overlap region.

According to the embodiment of the present invention, the overlap region forming the capacitance forming portion 120 may be exposed to the first side surface 1, the first internal electrode 123 may have the first lead out portion 123a extended from the capacitance forming portion 120 so as to be exposed to the first side surface 1, and the second internal electrode 124 may have the second lead out portion 124a extended from the capacitance forming portion 120 so as to be exposed to the first side surface 1.

The first and second lead out portions 123a and 124a are not overlapped with each other, such that the first and second internal electrodes 123 and 124 may be insulated from each other.

As described above, according to the embodiment of the present invention, the overlap region forming the capacitance forming portion 120 is formed in the ceramic body 110 so as to be exposed to the first side surface 1, whereby capacitance of the multilayer ceramic capacitor 100 may be increased.

In addition, a distance between the first and second internal electrodes to which voltages having different polarities are applied from the outside becomes close, such that a current loop may be shortened. Therefore, equivalent series inductance (ESL) may be decreased.

The second unit II may include the third internal electrode 125 including the capacitance forming portion 120 formed in the ceramic body 110 and having the overlap region for forming capacitance and the third lead out portion 125a extended from the capacitance forming portion 120 so as to be exposed to the first side surface 1; and the fourth internal electrode 126 alternately stacked with the third internal electrode 125, having the dielectric layer 111 interposed therebetween, insulated from the third internal electrode 125, and including the fourth lead out portion 126a extended from the capacitance forming portion 120 so as to be exposed to the first side surface 1.

The third and fourth internal electrodes 125 and 126 have the third and fourth lead out portions 125a and 126a, respectively, so as to be connected to the external electrodes having different polarities, and the third and fourth lead out portions 125a and 126a may be exposed to the first side surface 1 of the ceramic body 110.

According to the embodiment of the present invention, in the multilayer ceramic capacitor, the vertically laminated or vertically multilayered capacitor, the third and fourth lead out portions 125a and 126a may be exposed to the same surface of the ceramic body.

According to the embodiment of the present invention, the lead out portion of the internal electrode refers to a region in which a conductor pattern forming the internal electrode has an increased width W in a portion thereof to thereby be exposed to one surface of the ceramic body.

The third and fourth internal electrodes 125 and 126 may form capacitance in a region in which the third and fourth internal electrodes 125 and 126 are overlapped with each other, and the third and fourth lead out portions 125a and 126a connected to respective external electrodes having different polarities do not have an overlap region.

As described above, since the third and fourth lead out portions 125a and 126a are not overlapped with each other but are insulated from each other, short circuits between the internal electrodes due to positional errors between the internal electrodes opposing one another by stress when the ceramic body is cut may be reduced.

According to another embodiment of the present invention, since the first and second lead out portions 123a and 124a may be longer than those of the third and fourth lead out portions 125a and 126a and be exposed to the first side surface of the ceramic body 110, a path for removing remaining materials may be further secured when the ceramic body is sintered.

Therefore, connectivity of the internal electrodes may be further improved, such that capacitance of the multi layer ceramic capacitor may be increased.

Referring to FIG. 14, when the length of the first to fourth internal electrodes 123 to 126 in the length direction of the ceramic body 110 is defined as L, the length of a portion of the first internal electrode 123 exposed to the first side surface 1 in the length direction of the ceramic body 110 is defined as L3, and the length of the fourth lead out portion 126a in the length direction of the ceramic body 110 is defined as L4, 0.05≤L4/(L−L3)≤0.9 may be satisfied.

As described above, the length L of the first to fourth internal electrodes 123 to 126, the length L3 of the portion of the first internal electrode 123 exposed to the first side surface 1, and the length L4 of the fourth lead out portion 126a are adjusted so as to satisfy the following equation: 0.05≤L4/(L−L3)≤0.9, such that the capacitance may be increased, and short circuits may be reduced.

In the case in which L4/(L−L3) is below 0.05, the length of the first internal electrode 123 exposed to the first side surface of the ceramic body 110 is short, such that it may be difficult to secure a sufficient path for removing the remaining materials, an effect of an increase in capacitance may be insignificant.

In the case in which L4/(L−L3) is larger than 0.9, an interval between the first internal electrode 123 and the fourth lead out portion 126a that are exposed to the first side surface of the ceramic body 110 is narrow, short circuits may occur.

Referring to FIG. 15, it may be appreciated that the first and second units I and II are stacked in the ceramic body 110, having the dielectric layer interposed therebetween, to thereby be alternately exposed to the first side surface 1.

In the following Table 1, capacitances and short circuit rates are compared according to the length L of the first and second internal electrodes, the length L1 of the first lead out portion, and the length L2 of the second lead out portion, in the length direction of the ceramic body of the multilayer ceramic capacitor according to the embodiment of the present invention.

TABLE 1

|  | L2/(L − L1) ⟨0.05 | 0.05 ≤ L2/ (L − L1) ≤ 0.9 | x0.9⟨L2/(L − L1) |
|---|---|---|---|
| Capacitance (μF) | 2~9 | 10.2 | 10.4 |
| Short Circuit Rate (%) | 6 | 2 | 70 |

Referring to Table 1, it may be appreciated that in the multilayer ceramic capacitor according to the embodiment of the present invention, when L2/(L−L1) is outside of the numerical range of the present invention, the capacitance is reduced or the short circuit rate is increased.

On the contrary, it may be appreciated that when L2/(L−L1) satisfies the numerical range of the present invention, the capacitance is increased and the short circuit rate is reduced.

In the following Table 2, capacitances and short circuit rates are compared according to the length L of the first to fourth internal electrodes, the length L3 of the portion of the first lead out portion exposed to the first side surface, and the length L4 of the fourth lead out portion, in the length direction of the ceramic body.

TABLE 2

|  | L4/(L − L3) ⟨0.05 | 0.05 ≤ L4/ (L − L3) ≤ 0.9 | 0.9⟨L4/(L − L3) |
|---|---|---|---|
| Capacitance (μF) | 3~10 | 11.2 | 11.3 |
| Short Circuit Rate (%) | 14 | 3 | 70 |

Referring to Table 2, it may be appreciated that in the multilayer ceramic capacitor according to the embodiment of the present invention, when L4/(L−L3) is outside of the numerical range of the present invention, the capacitance is reduced or the short circuit rate is increased.

On the contrary, it may be appreciated that when L4/(L−L3) satisfies the numerical range of the present invention, the capacitance is increased and the short circuit rate is reduced.

According to the embodiment of the present invention, the overlap region is formed even in portions of the first and second internal electrodes exposed to the first side surface, whereby capacitance of the multilayer ceramic capacitor may be increased.

In addition, the first and second internal electrodes are alternately exposed to one side surface of the ceramic body, such that the short circuits between the internal electrodes may be reduced.

In addition, a distance between the first and second internal electrodes to which voltages having different polarities are applied from the outside becomes close, such that a current loop may be shortened. Therefore, ESL may be decreased.

As set forth above, according to the embodiments of the present invention, the first and second internal electrodes are alternately exposed to one side surface of the ceramic body, such that short circuits between the internal electrodes may be reduced.

According to the embodiments of the present invention, the overlap region forming the capacitance forming portion between the first and second internal electrodes is increased, whereby capacitance of the multilayer ceramic capacitor may be increased.

In addition, a distance between the first and second internal electrodes to which voltages having different polarities are applied from the outside becomes close, such that a current loop may be shortened. Therefore, ESL may be decreased.

Further, according to the embodiments of the present invention, a mounting area for the multilayer ceramic capacitor may be minimized on a printed circuit board, and acoustic noise may be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
    a ceramic body including a dielectric layer and having first and second main surfaces opposing one another, first and second side surfaces opposing one another, and first and second end surfaces opposing one another;
    a first internal electrode formed in the ceramic body and including a capacitance forming portion having an overlap region for forming capacitance and only one first lead out portion extended from the capacitance forming portion to be exposed to the first side surface;
    a second internal electrode alternately stacked with the first internal electrode, having the dielectric layer interposed therebetween, insulated from the first internal electrode, and having only one second lead out portion extended from the capacitance forming portion to be exposed to the first side surface;
    first and second external electrodes connected to the first and second lead out portions, respectively; and
    an insulation layer formed on the first side surface of the ceramic body,
    wherein the first lead out portion in a length direction of the ceramic body is longer than the second lead out portion in the length direction,
    wherein when a length of the first and second internal electrodes in a length direction of the ceramic body is defined as L, a length of the first lead out portion in the length direction of the ceramic body is defined as L1, and a length of the second lead out portion in the length direction of the ceramic body is defined as L2, $0.05 \le (L-L1) \le 0.9$ is satisfied.

2. The multilayer ceramic electronic component of claim 1, wherein the first and second internal electrodes are disposed perpendicularly with respect to a mounting surface of the ceramic body.

3. The multilayer ceramic electronic component of claim 1, wherein the first external electrode is extended to at least one of the first main surface, the second main surface, and the second side surface of the ceramic body.

4. The multilayer ceramic electronic component of claim 1, wherein the second external electrode is extended to at least one of the first main surface, the second main surface, and the second side surface of the ceramic body.

5. The multilayer ceramic electronic component of claim 1, wherein the insulation layer includes at least one selected from a group consisting of epoxy, a heat resistant polymer, glass, and ceramic.

6. The multilayer ceramic electronic component of claim 1, wherein the insulation layer is formed to cover all of the exposed portions of the first and second internal electrodes.

7. The multilayer ceramic electronic component of claim 1, wherein the insulation layer has a thickness less than those of the first and second external electrodes measured from the first side surface of the ceramic body.

8. A multilayer ceramic electronic component comprising:
    a ceramic body including a dielectric layer and having first and second main surfaces opposing one another, first and second side surfaces opposing one another, and first and second end surfaces opposing one another;
    a first unit including a first internal electrode having a capacitance forming portion formed in an overlap region provided to form capacitance in the ceramic body and exposed to the first side surface and only one first lead out portion extended from the capacitance forming portion to be exposed to the first side surface, and a second internal electrode alternately stacked with the first internal electrode, having the dielectric layer interposed therebetween, insulated from the first internal electrode, and including only one second lead out portion extended from the capacitance forming portion to be exposed to the first side surface;
    a second unit including a third internal electrode having a capacitance forming portion formed in the ceramic body and having an overlap region for forming the capacitance and a third lead out portion extended from the capacitance forming portion to be exposed to the first side surface, and a fourth internal electrode alternately stacked with the third internal electrode, having the dielectric layer interposed therebetween, insulated from the third internal electrode, and including a fourth lead out portion extended from the capacitance forming portion to be exposed to the first side surface;
    a first external electrode connected to the first and third lead out portions and a second external electrode connected to the second and fourth lead out portions; and
    an insulation layer formed on the first side surface of the ceramic body,
    wherein the first and second units are alternately stacked, having the dielectric layer interposed therebetween,
    wherein when a length of the first to fourth internal electrodes in a length direction of the ceramic body is defined as L, a length of a portion of the first internal electrode exposed to the first side surface in the length direction of the ceramic body is defined as L3, and a length of the fourth lead out portion in the length direction of the ceramic body is defined as L4, $0.05 \le L4/(L-L3) \le 0.9$ is satisfied.

9. The multilayer ceramic electronic component of claim 8, wherein the first and second internal electrodes are disposed perpendicularly with respect to a mounting surface of the ceramic body.

10. The multilayer ceramic electronic component of claim 8, wherein the first external electrode is extended to at least one of the first main surface, the second main surface, and the second side surface of the ceramic body.

11. The multilayer ceramic electronic component of claim 8, wherein the second external electrode is extended to at least one of the first main surface, the second main surface, and the second side surface of the ceramic body.

12. The multilayer ceramic electronic component of claim 8, wherein the insulation layer includes at least one selected from a group consisting of epoxy, a heat resistant polymer, glass, and ceramic.

13. The multilayer ceramic electronic component of claim 8, wherein the insulation layer is formed to cover all of the exposed portions of the first and second internal electrodes.

14. The multilayer ceramic electronic component of claim 8, wherein the insulation layer has a thickness less than those of the first and second external electrodes measured from the first side surface of the ceramic body.

\* \* \* \* \*